(12) United States Patent
Yanagisawa

(10) Patent No.: US 8,524,933 B2
(45) Date of Patent: Sep. 3, 2013

(54) BETA-KETOESTER GROUP-CONTAINING ORGANOPOLYSILOXANE COMPOUND

(75) Inventor: Hideyoshi Yanagisawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 721 days.

(21) Appl. No.: 12/639,513

(22) Filed: Dec. 16, 2009

(65) Prior Publication Data

US 2010/0152473 A1    Jun. 17, 2010

(30) Foreign Application Priority Data

Dec. 17, 2008  (JP) ................................. 2008-321067

(51) Int. Cl.
*C07F 7/04*        (2006.01)
(52) U.S. Cl.
USPC ......................................................... 556/440
(58) Field of Classification Search
None
See application file for complete search history.

(56) References Cited

U.S. PATENT DOCUMENTS

| | | | |
|---|---|---|---|
| 4,808,649 A | 2/1989 | Gay et al. | |
| 4,981,986 A * | 1/1991 | Yoshioka et al. | 556/410 |
| 2005/0137361 A1 | 6/2005 | Sakamoto et al. | |

FOREIGN PATENT DOCUMENTS

| | | |
|---|---|---|
| EP | 0286387 A2 | 10/1988 |
| JP | 11-323132 A | 11/1999 |
| JP | 2000-73041 A | 3/2000 |
| JP | 2004-307723 A | 11/2004 |
| JP | 2009-013201 A | 1/2009 |
| JP | 2010-1255 A | 1/2010 |
| JP | 2010-145622 A | 7/2010 |

OTHER PUBLICATIONS

European Search Report for Application No. 09252805.8 dated Feb. 12, 2010.
Decision of Refusal dated Apr. 3, 2012 for Japanese Application No. 2008-321067.
Office Action mailed Feb. 1, 2011, in Japanese Patent Application No. 2008-321067.

* cited by examiner

*Primary Examiner* — Sudhakar Katakam
(74) *Attorney, Agent, or Firm* — Birch, Stewart, Kolasch & Birch, LLP

(57) ABSTRACT

A novel organosilicon compound is provided as an organosilicon compound containing a β-ketoester structure that has minimal volatile components and generates a minimal amount of alcohol when used as a component within all manner of treatment agents. The organopolysiloxane is represented by an average composition formula shown below:

$$Y_a R^1_b R^2_c Si(OR^3)_d (OH)_e O_{(4-a-b-c-d-e)/2} \quad (1)$$

(wherein Y represents an organic group containing a β-ketoester group that may be at least partially enolized, $R^1$ represents a monovalent hydrocarbon group that may optionally include a functional group such as a mercapto group, an epoxy group or a (meth)acryloyloxy group, $R^2$ represents a monovalent hydrocarbon group that contains no functional groups, $R^3$ represents a monovalent hydrocarbon group, and a, b, c, d and e are numbers that satisfy $0.01 \leq a \leq 1$, $0 \leq b < 1$, $0 \leq c \leq 2$, $0 \leq d \leq 2$, and $0 \leq e \leq 1$ respectively, provided that $2 \leq a+b+c+d+e \leq 3$).

7 Claims, No Drawings

BETA-KETOESTER GROUP-CONTAINING ORGANOPOLYSILOXANE COMPOUND

BACKGROUND OF THE INVENTION

1. Field of the Invention

The present invention relates to a novel organopolysiloxane compound having a β-ketoester structure within the molecule, and a method of producing such a compound.

2. Description of the Prior Art

Organosilicon compounds having a β-ketoester structure within the molecule and also containing an alkoxysilyl group within the molecule are already known, and are disclosed, for example, in Patent Document 1. These compounds are useful as components within metal ion scavengers, surface treatment agents for inorganic materials, interfacial binding agents for composite materials composed of an inorganic material and an organic material, dispersants for inorganic materials, adhesion improvers for improving the bonding of organic-based adhesives to inorganic substrates, and primer compositions.

However, currently known β-ketoester structure-containing organosilicon compounds have a high degree of volatility, and therefore, when added to a resin as an adhesion improver for example, have been prone to volatilization, meaning a satisfactory effect has sometimes been unobtainable. Furthermore, each of the above reagents containing the organosilicon compound generates an alcohol upon treatment of an inorganic substrate, and reducing the amount of alcohol produced would be desirable.

[Patent Document 1] U.S. Pat. No. 4,981,986

SUMMARY OF THE INVENTION

Accordingly, an object of the present invention is to provide a novel organosilicon compound containing a β-ketoester structure, which has minimal volatile components, and generates a minimal amount of alcohol when used as a component within all manner of reagents.

As a result of intensive investigation aimed at achieving the above object, the inventors of the present invention discovered that by using, as the organosilicon compound, an organopolysiloxane compound represented by an average composition formula (1) shown below and having both a β-ketoester group-containing organic group and a hydrocarbyloxy group within a single molecule, the above object could be achieved.

Accordingly, the present invention provides an organopolysiloxane compound represented by an average composition formula (1) shown below, having both a β-ketoester group-containing organic group and a hydrocarbyloxy group within a single molecule:

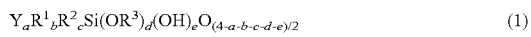

(wherein

Y represents an organic group containing a β-ketoester group that may be at least partially enolized, $R^1$ represents a monovalent hydrocarbon group of 1 to 18 carbon atoms that may optionally include at least one functional group (hereafter referred to as a "specified functional group") selected from the group consisting of a mercapto group, epoxy group, acryloyloxy group, methacryloyloxy group, alkenyl groups, amino group, halogen atoms, and groups generated when an enolized β-ketoester group undergoes an intramolecular or intermolecular reaction with a hydrocarbyloxy group represented by a formula: $OR^3$, $R^2$ represents a monovalent hydrocarbon group of 1 to 18 carbon atoms that contains no functional groups and is different from $R^1$, $R^3$ represents a monovalent hydrocarbon group of 1 to 4 carbon atoms, and a, b, c, d and e are numbers that satisfy $0.01 \leq a \leq 1$, $0 \leq b < 1$, $0 \leq c \leq 2$, $0 \leq d \leq 2$, and $0 \leq e \leq 1$ respectively, provided that $2 \leq a+b+c+d+e \leq 3$).

Furthermore, the present invention also provides a method of producing the above organopolysiloxane compound (referred to as "production method 1") that includes subjecting (a) at least one β-ketoester group-containing hydrocarbyloxysilane represented by a general formula (2) shown below (a1), or a partial hydrolysis product thereof (a2), or a combination of any of (a1) and (a2), to a partial homo-hydrolysis and polycondensation.

(wherein Y, $R^2$ and $R^3$ are as defined above, and m represents an integer of 0 to 2.)

Moreover, the present invention also provides a method of producing the above organopolysiloxane compound (referred to as "production method 2") that includes subjecting:

(a) at least one β-ketoester group-containing hydrocarbyloxysilane represented by the general formula (2) shown above, or a partial hydrolysis product thereof (a2), or a combination of any of (a1) and (a2), and (b) at least one compound selected from the group consisting of hydrocarbyloxysilanes represented by a general formula (3) shown below (b1), partial hydrolysis products thereof (b2), hydrocarbyloxysilanes represented by a general formula (4) shown below (b3), partial hydrolysis products thereof (b4), and condensation products of at least one of the above compounds (b5), to a partial co-hydrolysis and polycondensation.

(wherein Y, $R^1$, $R^2$ and $R^3$ are as defined above, m represents an integer of 0 to 2, n represents an integer of 0 to 2, and p represents an integer of 0 to 3.)

Compared with a monomeric β-ketoester structure-containing organosilicon compound, the organopolysiloxane compound of the present invention contains minimal components that can volatilize during use, and also generates a smaller amount of alcohol.

The organopolysiloxane compound of the present invention contains a β-ketoester group, and therefore exhibits a metal ion trapping function, and also has the function of improving adhesion with organic resins, not via chemical bonding, but via hydrogen bonding.

In those cases where the organopolysiloxane compound also includes another functional group besides the β-ketoester group within the molecule, appropriate selection of this additional functional group enables a multifunctional organopolysiloxane compound to be obtained that exhibits specific desired functions.

DETAILED DESCRIPTION OF THE PREFERRED EMBODIMENTS

A more detailed description of the present invention is provided below.

<β-Ketoester Group-Containing Organopolysiloxane Compound>

As described above, the organopolysiloxane compound of the present invention is represented by an average composition formula (1) shown below.

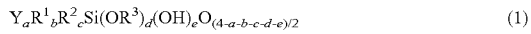     (1)

The organopolysiloxane compound is a compound that includes a β-ketoester group and a hydrocarbyloxy group as reactive groups within a single molecule. At least a portion of the β-ketoester groups may be enolized (namely, tautomerized to form an enol), but in the following description, such enols are also simply referred to using the term "β-ketoester group".

In the above formula (1), Y represents a β-ketoester group-containing organic group, and may be represented, for example, by a general formula below:

(wherein Z represents a β-ketoester group and Q represents a divalent hydrocarbon group).

The group Z is preferably a β-ketoester group represented by a formula shown below:

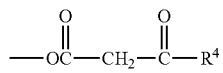

(wherein, $R^4$ represents a substituted or unsubstituted, but preferably unsubstituted, linear or branched alkyl group of 1 to 10 carbon atoms, or a substituted or unsubstituted, but preferably unsubstituted, phenyl group, and is most preferably a methyl group).

The alkyl group represented by $R^4$ is a linear or branched, but preferably a linear, unsubstituted alkyl group that contains 1 to 10 carbon atoms, more preferably 1 to 6 carbon atoms, and most preferably 1 to 4 carbon atoms. Specific examples include a methyl group, ethyl group, propyl group or butyl group, and a methyl group is particularly desirable.

Examples of the substituent on a substituted phenyl group represented by $R^4$ include a halogen atom such as a chlorine or bromine atom, an alkyl group of 1 to 6 carbon atoms, or an alkoxy group of 1 to 6 carbon atoms.

The divalent hydrocarbon group represented by Q is preferably a divalent hydrocarbon group of 1 to 10 carbon atoms, and more preferably 1 to 6 carbon atoms. Specific examples of preferred groups include alkylene groups such as a methylene group, ethylene group, propylene group, butylene group or hexylene group, and a propylene group is particularly desirable.

In the formula (1), $R^1$ represents a hydrocarbon group of 1 to 18 carbon atoms, and preferably 1 to 8 carbon atoms, which may be optionally substituted with at least one of the aforementioned specified functional groups. Examples of the hydrocarbon group of 1 to 18 carbon atoms include linear or branched alkyl groups such as a methyl group, ethyl group, propyl group, isopropyl group, butyl group, isobutyl group, t-butyl group, hexyl group or octyl group; substituted or unsubstituted aryl groups such as a phenyl group or tolyl group; and substituted or unsubstituted aralkyl groups such as a benzyl group or phenylethyl group, all of which may be optionally substituted with at least one of the aforementioned specified functional groups. A propyl group is particularly desirable. In those cases where the only properties expected of the organopolysiloxane compound of the present invention are the properties provided by the β-ketoester group-containing organic group (Y), the compound need not include any of the above specified functional groups. However, in those cases where, in addition to the properties provided by the β-ketoester group-containing organic group, it is desirable that the compound also exhibit other properties, one or more of the specified functional groups may also be incorporated within the molecule. These specified functional groups may be selected in accordance with the properties that need to be imparted to the organopolysiloxane compound. It is particularly desirable that the compound of the present invention also includes a mercapto group and/or an epoxy group.

In the above description, the expression "groups generated when an enolized β-ketoester group undergoes an intramolecular or intermolecular reaction with a hydrocarbyloxy group" describes cross-linked structures formed by an exchange reaction that occurs either intramolecularly within a molecule of the organopolysiloxane compound, or intermolecularly between molecules of the organopolysiloxane compound.

In the formula (1), $R^2$ represents a monovalent hydrocarbon group of 1 to 18 carbon atoms, and preferably 1 to 8 carbon atoms, that contains no functional groups, and is different from $R^1$. Examples of $R^2$ include linear or branched alkyl groups such as a methyl group, ethyl group, propyl group, isopropyl group, butyl group, isobutyl group, t-butyl group, hexyl group, octyl group, decyl group or octadecyl group; aryl groups such as a phenyl group or tolyl group; and aralkyl groups such as a benzyl group or phenylethyl group, all of which groups may optionally contain substituents other than the functional group described below. A methyl group is particularly desirable. Here the term "functional group" describes a group of atoms that characterizes the organopolysiloxane compound, and refers to a reactive atom group. Examples of the functional group include not only the aforementioned specified functional groups, but also a carboxyl group, hydroxyl group, aldehyde group, carbonyl group, —$NO_2$ group, —NO group and —$N_3$ group.

In the formula (1), $R^3$ represents a monovalent hydrocarbon group of 1 to 4 carbon atoms, and specific examples include linear or branched, preferably linear alkyl groups such as a methyl group, ethyl group, propyl group or butyl group. Of these, a methyl group or ethyl group is particularly desirable.

a, b, c, d and e are numbers that satisfy $0.01 \leq a \leq 1$, $0 \leq b < 1$, $0 \leq c \leq 2$, $0 \leq d \leq 2$, and $0 \leq e \leq 1$ respectively, provided that $2 \leq a+b+c+d+e \leq 3$.

In the formula (1), a is a number that represents the ratio, within the organopolysiloxane compound, of the number of β-ketoester group-containing organic groups (Y) relative to the number of silicon atoms. If the value of a is less than 0.01, then the desired properties provided by the reactivity of the β-ketoester group-containing organic groups do not manifest satisfactorily during use of the organopolysiloxane compound. In contrast, increasing a to a value that exceeds 1 is problematic in terms of the synthesis method employed and the associated costs. Accordingly, a must satisfy the range $0.01 \leq a \leq 1$, but preferably satisfies $0.1 \leq a \leq 1$, and more preferably $0.1 \leq a \leq 0.8$.

Furthermore, b is a number that represents the ratio, within the organopolysiloxane compound, of the number of monovalent hydrocarbon groups ($R^1$) of 1 to 18 carbon atoms that may optionally include the specified functional group relative to the number of silicon atoms. If the value of b is either 0 or a comparatively small number, then the amount of hydrocarbyloxy groups ($OR^3$) such as alkoxy groups increases relatively, meaning hydrolysis reactions and silylation reactions occur more readily, and in some cases the affinity of the organopolysiloxane for water may also increase.

In contrast, in the case where the value of b is comparatively large, if $R^1$ includes the specified functional group, the reactivity of the organopolysiloxane compound with organic resins such as epoxy resins, urethane resins, polyamide resins, polyimide resins, polyester resins and acrylic resins is enhanced, whereas if $R^1$ does not include the specified functional group, then depending on the nature of the monovalent hydrocarbon group ($R^1$), the organopolysiloxane compound may be imparted with hydrophobic properties (for example in those cases where $R^1$ is an alkyl group) or may exhibit improved affinity and/or compatibility with organic compounds and organic resins (for example in those cases where $R^1$ is a phenyl group). However, when b is comparatively large, the amount of hydrocarbyloxy groups such as alkoxy groups decreases relatively, meaning the reactivity of hydrocarbyloxysilyl groups and the like tends to deteriorate. Accordingly, the value of b must be selected within the range $0 \leq b < 1$ in accordance with the intended usage of the organopolysiloxane. The value of b preferably satisfies the range $0 \leq b \leq 0.8$, and more preferably $0 \leq b \leq 0.5$.

Further, c is a number that represents the ratio, within the organopolysiloxane compound, of the number of monovalent hydrocarbon groups ($R^2$) of 1 to 18 carbon atoms that contain no functional groups and are different from $R^1$, relative to the number of silicon atoms. If the value of c is either 0 or a comparatively small number, then the amount of hydrocarbyloxy groups ($OR^3$) such as alkoxy groups increases relatively, meaning hydrolysis reactions and silylation reactions occur more readily, and in some cases the affinity of the organopolysiloxane compound for water may also increase. In contrast, if the value of c is comparatively large, then various effects may be obtained, including imparting the organopolysiloxane compound with hydrophobicity, and imparting a cured product of the organopolysiloxane compound with superior flexibility and releasability. However, when c is comparatively large and the amount of hydrocarbyloxy groups ($OR^3$) decreases relatively, the reactivity of hydrocarbyloxysilyl groups and the like tends to deteriorate. Accordingly, the value of c must be selected within the range $0 \leq c \leq 2$ in accordance with the intended usage of the organopolysiloxane. The value of c preferably satisfies the range $0 \leq c \leq 1$, and more preferably $0 \leq c \leq 0.8$.

Furthermore, d is a number that represents the ratio, within the organopolysiloxane compound, of the number of hydrocarbyloxy groups ($OR^3$) relative to the number of silicon atoms, and this number may be set in accordance with the intended usage of the compound. The range for d must satisfy $0 \leq d \leq 2$, wherein the closer this number is to 0, the lower the reactivity of the organopolysiloxane with inorganic materials, whereas the closer this number is to 2, the higher the reactivity of the organopolysiloxane with inorganic materials. The value of d preferably satisfies the range $0 < d \leq 1.8$, and more preferably $1 \leq d \leq 1.83$.

Moreover, e is a number that represents the ratio, within the organopolysiloxane compound, of the number of hydroxyl groups (OH) relative to the number of silicon atoms, or in other words, represents the silanol group content within the compound. These silanol groups can participate in silylation reactions and condensation reactions, and have the effect of imparting hydrophilicity to the organopolysiloxane compound. However, from the viewpoint of achieving favorable storage stability for the organopolysiloxane compound, this silanol group content is preferably reduced as far as possible. Accordingly, the range for e must satisfy $0 \leq e \leq 1$, preferably satisfies $0 \leq e \leq 0.5$, and more preferably $0 \leq e \leq 0.2$.

The sum of a+b+c+d+e determines the value for [4−(a+b+c+d+e)]/2 which represents the condensation degree of the organopolysiloxane compound represented by the average composition formula (1), and this sum must satisfy $2 \leq a+b+c+d+e \leq 3$.

Furthermore, the polymerization degree of individual molecules of the organopolysiloxane compound may be set within a range from 2 to several hundred. In other words, the organopolysiloxane compound may include molecules from dimers containing two silicon atoms through to polymer molecules containing several hundred silicon atoms. However, when the average polymerization degree is 2, the monomer content within the organopolysiloxane compound tends to increase, meaning the primary targeted use of the silicone hydrocarbyloxy oligomers (namely, the low volatility) is lost. On the other hand, if the average polymerization degree is too large, then the organopolysiloxane compound adopts a highly viscous state, or becomes a paste or solid, which makes handling difficult. Accordingly, the average polymerization degree is preferably within a range from 3 to 100, more preferably from 3 to 50, and still more preferably from 6 to 20. For these reasons, the aforementioned sum of (a+b+c+d+e) preferably satisfies $2.02 \leq a+b+c+d+e \leq 2.67$, and more preferably satisfies $2.04 \leq a+b+c+d+e \leq 2.67$.

The molecular structure of the organopolysiloxane compound of the present invention may be a linear, branched or cyclic structure, or a combination thereof. The organopolysiloxane compound is typically not a single structure, but is rather a mixture containing a variety of different structures.

<Production Method>

The organopolysiloxane compound of the present invention can be obtained using all manner of conventional methods. Representative production methods include the production method 1 and the production method 2 mentioned above, which are described in detail below.

—Production Method 1—

This method involves subjecting (a) at least one β-ketoester group-containing hydrocarbyloxysilane represented by a general formula (2) shown below (a1), or a partial hydrolysis product thereof (a2), or a combination thereof (a3), to a partial homo-hydrolysis and polycondensation.

—Production Method 2—

This method involves subjecting:

(a) at least one β-ketoester group-containing hydrocarbyloxysilane represented by the general formula (2) shown below (a1), or a partial hydrolysis product thereof (a2), or a combination thereof (a3), and (b) at least one compound selected from the group consisting of hydrocarbyloxysilanes represented by a general formula (3) shown below (b1), partial hydrolysis products thereof (b2), hydrocarbyloxysilanes represented by a general formula (4) shown below (b3), partial hydrolysis products thereof (b4), and condensation products (b5) of at least one of (b1) to (b4), to a partial co-hydrolysis and polycondensation.

  (2)

  (3)

  (4)

(wherein Y, $R^1$, $R^2$ and $R^3$ are as defined above, m represents an integer of 0 to 2 and is preferably 0 or 1, n represents an integer of 0 to 2 and is preferably 0, and p represents an integer of 0 to 3 and is preferably 0 or 1.)

Specific examples of the compound represented by the general formula (2) include the compounds shown below.

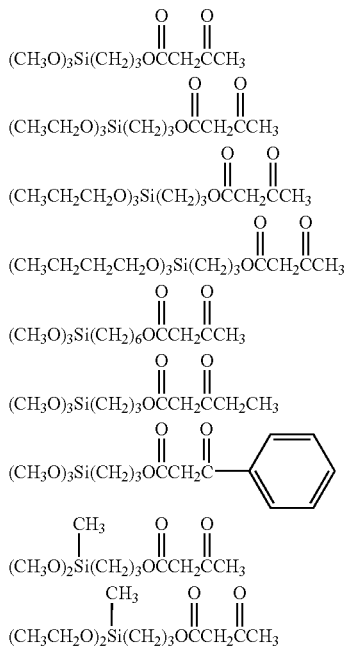

A description of the compound represented by the general formula (3) is presented below. $R^1$ represents a hydrocarbon group of 1 to 18 carbon atoms that may optionally include the aforementioned specified functional group.

Examples of the hydrocarbon group of 1 to 18 carbon atoms in those cases where $R^1$ does not include the aforementioned specified functional group are as listed above. Examples of the hydrocarbon group of 1 to 18 carbon atoms in those cases where $R^1$ includes the aforementioned specified functional group include a mercaptomethyl group, 3-mercaptopropyl group, 6-mercaptohexyl group, 10-mercaptodecyl group, 4-(mercaptomethyl)phenylethyl group, glycidoxymethyl group, 3-glycidoxypropyl group, 5,6-epoxyhexyl group, 9,10-epoxydecyl group, 2-(3,4-epoxycyclohexyl)ethyl group, 2-(3,4-epoxy-4-methylcyclohexyl)propyl group, acryloyloxymethyl group, 3-acryloyloxypropyl group, 6-acryloyloxyhexyl group, 10-acryloyloxydecyl group, methacryloyloxymethyl group, 3-methacryloyloxypropyl group, 6-methacryloyloxyhexyl group, 10-methacryloyloxydecyl group, vinyl group, allyl group, 5-hexenyl group, 9-decenyl group, 3-vinyloxypropyl group, p-styryl group, cyclohexenylethyl group, chloromethyl group, 3-chloropropyl group, 6-chlorohexyl group, 10-chlorodecyl group, bromomethyl group, 3-bromopropyl group, trifluoropropyl group, heptadecafluorodecyl group, aminomethyl group, 3-aminopropyl group, 2-aminopropyl group, N-methyl-3-aminopropyl group, N,N-dimethyl-3-aminopropyl group, N-phenyl-3-aminopropyl group, N-(2-aminoethyl)-3-aminopropyl group, N-(6-aminohexyl)-3-aminopropyl group, and N-(vinylbenzyl)-2-aminoethyl-3-aminopropyl group.

Examples of the hydrocarbyloxysilanes represented by the general formula (3) which include the aforementioned specified functional group and in which $R^3$ represents an alkyl group (namely, alkoxysilanes) include trimethoxysilanes, triethoxysilanes, methyldimethoxysilanes, methyldiethoxysilanes, ethyldimethoxysilanes, ethyldiethoxysilanes, propyldimethoxysilanes, propyldiethoxysilanes, dimethylmethoxysilanes, dimethylethoxysilanes, ethoxydimethoxysilanes and methoxydiethoxysilanes containing a hydrocarbon group of 1 to 18 carbon atoms ($R^1$) that includes any of the specified functional groups listed above.

Specific examples of the compound represented by the general formula (3) include 3-mercaptopropyltrimethoxysilane, 3-mercaptopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, chloropropyltrimethoxysilane, chloropropyltriethoxysilane, trifluoropropyltrimethoxysilane, heptadecafluorodecyltrimethoxysilane, propyltrimethoxysilane, hexyltrimethoxysilane, decyltrimethoxysilane, 3-mercaptopropylmethyldimethoxysilane, 3-mercaptopropylmethyldiethoxysilane, 3-glycidoxypropylmethyldimethoxysilane, 3-glycidoxypropylmethyldiethoxysilane, 2-(3,4-epoxycyclohexyl)ethylmethyldimethoxysilane, 2-(3,4-epoxycyclohexyl)ethylmethyldiethoxysilane, chloropropylmethyldimethoxysilane, chloropropylmethyldiethoxysilane, trifluoropropylmethyldimethoxysilane, heptadecafluorodecylmethyldimethoxysilane, propylmethyldimethoxysilane, hexylmethyldimethoxysilane, and decylmethyldimethoxysilane.

Of these, 3-mercaptopropyltrimethoxysilane, 3-mercaptopropyltriethoxysilane, 3-glycidoxypropyltrimethoxysilane, 3-glycidoxypropyltriethoxysilane, epoxycyclohexyl)ethyltrimethoxysilane and 2-(3,4-epoxycyclohexyl)ethyltriethoxysilane are preferred.

Examples of the hydrocarbyloxy group-containing silane represented by the general formula (4) are presented below. Specifically, examples of the hydrocarbyloxysilane when p=0 in the general formula (4) include tetramethoxysilane, tetraethoxysilane, tetrapropoxysilane, tetraisopropoxysilane, tetrabutoxysilane and tetraisobutoxysilane. Examples of the hydrocarbyloxysilane when p=1 in the general formula (4) include trimethoxysilanes, triethoxysilanes, tripropoxysilanes, triisopropxysilanes, tributoxysilanes and triisobutoxysilanes containing, for example, a methyl group, ethyl group, propyl group, isopropyl group, butyl group, isobutyl group, t-butyl group, hexyl group, octyl group, phenyl group, tolyl group, benzyl group or phenylethyl group as $R^2$. Specific examples include methyltrimethoxysilane, methyltriethoxysilane, ethyltrimethoxysilane, propyltrimethoxysilane, hexyltrimethoxysilane, decyltrimethoxysilane and octadecyltrimethoxysilane. Examples of the hydrocarbyloxysilane when p=2 in the general formula (4) include dimethoxysilanes, diethoxysilanes, dipropoxysilanes, diisopropxysilanes, dibutoxysilanes and diisobutoxysilanes containing, for example, two identical or different groups selected from amongst a methyl group, ethyl group, propyl group, isopropyl group, butyl group, isobutyl group, t-butyl group, hexyl group, octyl group, phenyl group, tolyl group, benzyl group or phenylethyl group as $R^2$. Specific examples include dimethyldimethoxysilane, dimethyldiethoxysilane, dimethyldipropoxysilane, dimethyldibutoxysilane, methylethyldimethoxysilane, diphenyldimethoxysilane and diphenyldiethoxysilane. Examples of the hydrocarbyloxysilane when p=3 in the general formula (4) include methoxysilanes, ethoxysilanes, propoxysilanes, isopropxysilanes, butoxysilanes and isobutoxysilanes containing, for example, three identical or different groups selected from amongst a methyl group, ethyl group, propyl group, isopropyl group, butyl group, isobutyl group, t-butyl group, hexyl group, octyl group, phenyl group, tolyl group, benzyl group or phenylethyl group as $R^2$. Specific examples include trimethylmethoxysilane, trimethylethoxysilane, trimethylpropoxysilane, trimethylbutoxysilane, dimethylmonoethylmethoxysilane, triphenylmethoxysilane and triphenylethoxysilane.

Of the hydrocarbyloxysilanes represented by the general formula (4) listed above, methyltrimethoxysilane, methyltriethoxysilane, methyltripropoxysilane, methyltriisopropoxysilane, methyltributoxysilane, methyltriisobutoxysilane, tetramethoxysilane, tetraethoxysilane, tetrapropoxysilane, tetraisopropoxysilane, tetrabutoxysilane and tetraisobutoxysilane are preferred.

The hydrocarbyloxysilane represented by the general formula (3) and the hydrocarbyloxysilane represented by the general formula (4) may each be used in the form of a partial hydrolysis product, or as a mixture containing the hydrocarbyloxysilane of the general formula (3) and/or the general formula (4) and a partial hydrolysis product thereof. Furthermore, these compounds may also be used in the form of a condensation product produced by mutual condensation of any one or more of the compounds. Moreover, the hydrocarbyloxysilane represented by the general formula (3) and the partial hydrolysis product thereof, and the hydrocarbyloxysilane represented by the general formula (4) and the partial hydrolysis product thereof may each comprise either a single compound or a combination of a plurality of different compounds.

In the production method 1, the component (a) composed of at least one (3-ketoester group-containing hydrocarbyloxysilane represented by the general formula (2) (a1), or a partial hydrolysis product thereof (a2), or a combination thereof (a3) is subjected to partial hydrolysis and polycondensation.

In the production method 2, the component (a) composed of at least one β-ketoester group-containing hydrocarbyloxysilane represented by the general formula (2), or a partial hydrolysis product thereof, or a combination thereof, and the component (b) composed of at least one compound selected from the group consisting of hydrocarbyloxysilanes represented by the general formula (3) (b1), partial hydrolysis products thereof (b2), hydrocarbyloxysilanes represented by the general formula (4) (b3), partial hydrolysis products thereof (b4), and condensation products (b5) of at least one of (b1) to (b4) are subjected to partial co-hydrolysis and polycondensation.

In the production method 2, there are no particular restrictions on the ratio between the component (a) and the component (b). However, if the proportion of the β-ketoester group-containing organosilicon compound of the component (a) is too small, then the properties derived from the β-ketoester group are less likely to manifest satisfactorily within the resulting β-ketoester group-containing organopolysiloxane compound of the present invention, and therefore the ratio must be set so that at least one β-ketoester group exists within each molecule. Accordingly, the ratio between the component (a) and the component (b), reported as a molar ratio of silicon atoms, is preferably within a range from 1:99 to 99:1, more preferably from 10:90 to 80:20. There are no particular restrictions on the sequence in which the component (a) and the component (b) are blended, nor on the mixing method used or the method employed for conducting the partial cohydrolysis and polycondensation.

In both the production method 1 and the production method 2, normally, conventional methods are used to add water to either the component (a) or a mixture of the component (a) and the component (b), in the presence of a hydrolysis-polycondensation reaction catalyst, thereby effecting a partial (co)-hydrolysis and polycondensation reaction. During this reaction, a suitable organic solvent may also be used if required.

Any of the numerous conventional catalysts may be used as the hydrolysis-polycondensation reaction catalyst, and specific examples include organic acids such as acetic acid, trifluoroacetic acid, butyric acid, oxalic acid, maleic acid, citric acid, methanesulfonic acid, p-toluenesulfonic acid and trifluoromethanesulfonic acid; inorganic acids such as hydrochloric acid, nitric acid, phosphoric acid and sulfuric acid; basic compounds such as sodium hydroxide, potassium hydroxide, sodium bicarbonate, sodium carbonate, sodium acetate, potassium acetate, ammonia, ammonium hydroxide and triethylamine; fluorine-containing compounds such as potassium fluoride and ammonium fluoride; and organometallic compounds such as tetraisopropyl titanate, tetrabutyl titanate, dioctyltin dilaurate and aluminum chelates. The above catalysts may be used individually, or a plurality of different catalysts may be used in combination. The amount of catalyst used is preferably within a range from 0.0001 to 10 mol %, and more preferably from 0.001 to 3 mol %, relative to the Si atoms that exist within the total raw material mixture.

As mentioned above, in the production of the organopolysiloxane compound of the present invention, the average polymerization degree is determined by the amount of water used during the partial hydrolysis and polycondensation. If water is added in excess, then an equivalent amount of hydrocarbyloxy groups undergo hydrolysis, resulting in a resin having numerous branch structures, and making it difficult to obtain the targeted silicone oligomer containing the hydrocarbyloxy groups. Accordingly, the amount of water added for effecting hydrolysis must be strictly controlled. For example, in the case where the hydrocarbyloxysilane raw material used is composed entirely of a monomer having a single silicon atom, in order to prepare an organopolysiloxane compound with an average polymerization degree of Z, the partial hydrolysis and polycondensation is preferably conducted by using $(Z-1)$ mols of water per Z mols of the hydrocarbyloxysilane raw material.

During this process, an organic solvent such as an alcohol, ether, ester or ketone may be used if required. Specific examples of these solvents include alcohols such as methanol, ethanol, n-propyl alcohol, isopropyl alcohol and propylene glycol monomethyl ether; ethers such as diethyl ether and dipropyl ether; esters such as methyl acetate, ethyl acetate and ethyl acetoacetate; and ketones such as acetone, methyl ethyl ketone and methyl isobutyl ketone. Further, a non-polar solvent such as hexane, toluene or xylene may be used in combination with one or more of the above solvents. The use of an alcohol such as methanol, ethanol or isopropyl alcohol is particularly desirable.

The amount used of the organic solvent is typically within a range from 0 to 1,000 parts by mass per 100 parts by mass of the combination of the hydrocarbyloxysilanes, partial hydrolysis products thereof, and condensation products thereof that function as the raw material. If due consideration is given to the homogeneity of the reaction system when the hydrolysis is initiated, the effects of adding the solvent, and the pot yield, then the amount of the solvent is preferably within a range from 10 to 500 parts by mass, and more preferably from 15 to 200 parts by mass, per 100 parts by mass of the combined hydrocarbyloxysilane raw material.

The actual operation of the partial (co)-hydrolysis and polycondensation reaction preferably involves either conducting a dropwise addition of a predetermined amount of water or a mixed solution of water and the organic solvent to a mixed system composed of the hydrocarbyloxysilane raw material, the catalyst and the organic solvent, or alternatively, conducting a dropwise addition of a predetermined amount of a mixed solution of water and the catalyst, or a mixed solution of water, the catalyst and the organic solvent to a mixed system composed of the hydrocarbyloxysilane raw material and the organic solvent. It is also possible to subject a hydrocarbyloxysilane raw material having a group that exhibits a high degree of hydrolysis reactivity such as methoxy group or ethoxy group, and a hydrocarbyloxysilane raw material having a group that exhibits a low degree of hydrolysis reactivity such as an alkoxy group of 3 to 4 carbon atoms such as a propoxy group or butoxy group to separate partial hydrolysis reactions, subsequently mix the two components together, perform an additional partial co-hydrolysis if required, and then perform the polycondensation reaction.

Each of the reactions is executed within a temperature range from 0 to 150° C. Temperatures lower than room temperature generally result in the reaction proceeding slowly and are therefore not practical. In contrast, if the temperature is too high, then enolized isomeric forms of the β-ketoester groups tend to react with the hydrocarbyloxy groups within other molecules, resulting in cross-linking reactions that can cause viscosity increase and gelling, and the high temperature also tends to have adverse effects on the specified functional groups, causing thermal decomposition of the epoxy groups or mercapto groups or the like, or thermal polymerization of the acryloyloxy groups. Accordingly, the reactions are preferably conducted within a temperature range from 20 to 130° C. Following reaction, the product is purified by removing the catalyst using a neutralization, adsorption or filtering operation or the like, and removing the organic solvent used, the alcohol produced as a by-product and any low boiling point products by distillation, thereby yielding the targeted organopolysiloxane compound of the present invention.

EXAMPLES

A more detailed description of the present invention is presented below based on a series of examples, although these examples are intended to be merely exemplary of the present invention, and the present invention is in no way limited by the examples presented below.

The organopolysiloxane compounds obtained in the synthesis examples described below were analyzed using the methods described below.

(1) The average polymerization degree of the organopolysiloxane compound was calculated from the weight average molecular weight, which was determined on the basis of a calibration curve prepared for polystyrene standards using gel permeation chromatography (GPC).

(2) Analysis of the structure of the organopolysiloxane compound was based on analysis of the infrared absorption spectrum (IR) and the proton nuclear magnetic resonance spectrum ($^1$H-NMR).

Example 1

Synthesis of an Organopolysiloxane Compound Having a Structure Represented by the Average Composition Formula (1) in which a=1, b=0, c=0 and d=1.33

A 1 L flask fitted with a stirrer, a reflux condenser, a thermometer and a dropping funnel was charged with 316.8 g (1.2 mols) of an acetoacetate functional group-containing trimethoxysilane represented by a formula shown below:

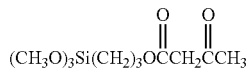

and 32 g (1.0 mols) of methanol, and with the contents of the flask undergo stirring at an internal temperature of 20 to 30° C., a mixed solution of 18 g of a 0.05 N aqueous solution of hydrochloric acid (1.0 mols) and 48 g (1.5 mols) of methanol was added dropwise to the flask over a period of 30 minutes. The temperature was then raised, and the mixture was heated under reflux for 2 hours.

Subsequently, 11.2 g of a 1% by mass methanol solution of potassium fluoride (KF: 1.92×10$^{-3}$ mols) was added to the flask, and the mixture was heated under reflux for a further 2 hours to effect a partial hydrolysis and polycondensation reaction. Subsequently, the internal temperature was raised to 120° C. under normal pressure to remove the alcohol component by distillation, and the product was then filtered, yielding a colorless and transparent organopolysiloxane compound (255 g, yield: 94%).

The viscosity of this organopolysiloxane compound at 25° C. was 158 mm$^2$/s, the specific gravity was 1.200, and the refractive index was 1.4461. Analysis of the nuclear magnetic resonance spectrum of the compound confirmed the existence of a β-ketoester group and the corresponding enol isomeric group-containing organic group, and a methoxy group, and moreover, also confirmed the formation of cross-linked structures via an exchange reaction between the enol isomeric group and the methoxy group.

The weight average molecular weight of the compound was 7,366.

Example 2

Synthesis of an Organopolysiloxane Compound Having a Structure Represented by the Average Composition Formula (1) in which a=0.5, b=0, c=0.5 and d=1.33

A 1 L flask fitted with a stirrer, a reflux condenser, a thermometer and a dropping funnel was charged with 306 g (1.0 mols) of an acetoacetate functional group-containing triethoxysilane represented by a formula shown below,

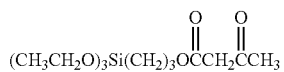

178 g (1.0 mols) of methyltriethoxysilane, and 45 g (1 mol) of ethanol, and with the contents of the flask undergo stirring at an internal temperature of 20 to 30° C., a mixed solution of 30 g of a 0.05 N aqueous solution of hydrochloric acid (1.667 mols) and 45 g (1 mol) of ethanol was added dropwise to the flask over a period of 30 minutes. The temperature was then raised, and the mixture was heated under reflux for 2 hours.

Subsequently, 11.2 g of a 1% by mass ethanol solution of potassium fluoride (KF: 1.92×10$^{-3}$ mols) was added to the flask, and the mixture was heated under reflux for a further 2 hours to effect a partial co-hydrolysis and polycondensation reaction. Subsequently, the internal temperature was raised to 120° C. under normal pressure to remove the alcohol component by distillation, and the product was then filtered, yielding a colorless and transparent organopolysiloxane compound (342 g, yield: 94%).

Analysis of the nuclear magnetic resonance spectrum of this compound confirmed the existence of a β-ketoester group and the corresponding enol isomeric group-containing organic group, an ethoxy group and a methyl group, and moreover, also confirmed the formation of cross-linked structures via an exchange reaction between the enol isomeric group and the alkoxy group.

The weight average molecular weight of the compound was 6,727.

Example 3

Synthesis of an Organopolysiloxane Compound Having a Structure Represented by the Average Composition Formula (1) in which a=0.5, b=0, c=0 and d=1.83

A 1 L flask fitted with a stirrer, a reflux condenser, a thermometer and a dropping funnel was charged with 306 g (1.0 mols) of an acetoacetate functional group-containing triethoxysilane represented by a formula shown below,

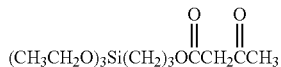

208 g (1.0 mols) of tetraethoxysilane, and 45 g (1 mol) of ethanol, and with the contents of the flask undergo stirring at an internal temperature of 20 to 30° C., a mixed solution of 30 g of a 0.05 N aqueous solution of hydrochloric acid (1.667 mols) and 45 g (1 mol) of ethanol was added dropwise to the flask over a period of 30 minutes. The temperature was then raised, and the mixture was heated under reflux for 2 hours.

Subsequently, 11.2 g of a 1% by mass ethanol solution of potassium fluoride (KF: $1.92 \times 10^{-3}$ mols) was added to the flask, and the mixture was heated under reflux for a further 2 hours to effect a partial co-hydrolysis and polycondensation reaction. Subsequently, the internal temperature was raised to 120° C. under normal pressure to remove the alcohol component by distillation, and the product was then filtered, yielding a colorless and transparent organopolysiloxane compound (342 g, yield: 94%).

Analysis of the nuclear magnetic resonance spectrum of this compound confirmed the existence of a β-ketoester group and the corresponding enol isomeric group-containing organic group, and an ethoxy group, and moreover, also confirmed the formation of cross-linked structures via an exchange reaction between the enol isomeric group and the alkoxy group.

The weight average molecular weight of the compound was 9,803.

Example 4

Synthesis of an Organopolysiloxane Compound Having a Structure Represented by the Average Composition Formula (1) in which a=0.833, b=0.167, c=0 and d=1.33

With the exceptions of altering the amount of the acetoacetate functional group-containing trimethoxysilane used in the example 1 from 316.8 g (1.2 mols) to 264.0 g (1.0 mols), and also adding 47.2 g (0.2 mols) of γ-glycidoxypropyltrimethoxysilane as an additional raw material monomer besides the acetoacetate functional group-containing trimethoxysilane, a colorless and transparent organopolysiloxane compound was obtained in the same manner as the example 1 (248 g, yield: 93.5%).

Analysis of the nuclear magnetic resonance spectrum of this compound confirmed the existence of a β-ketoester group and the corresponding enol isomeric group-containing organic group, a glycidyl group and a methoxy group, and moreover, also confirmed the formation of cross-linked structures via an exchange reaction between the enol isomeric group and the methoxy group.

The weight average molecular weight of the compound was 10,211.

Example 5

Synthesis of an Organopolysiloxane Compound Having a Structure Represented by the Average Composition Formula (1) in which a=1.0, b=0, c=0.2 and d=1.0

With the exceptions of altering the amount of the acetoacetate functional group-containing trimethoxysilane used in the example 1 from 316.8 g (1.2 mols) to 264.0 g (1.0 mols), adding 62.0 g (0.25 mols) of an acetoacetate functional group-containing methyldimethoxysilane represented by a formula shown below:

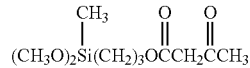

as an additional raw material monomer besides the acetoacetate functional group-containing trimethoxysilane, and altering the amount of the 0.05 N aqueous solution of hydrochloric acid to 20.25 g (1.125 mols), a colorless and transparent organopolysiloxane compound was obtained in the same manner as the example 1 (259 g, yield: 94.4%).

Analysis of the nuclear magnetic resonance spectrum of this compound confirmed the existence of β-ketoester group and the corresponding enol isomeric group-containing organic group, a methyl group and a methoxy group, and moreover, also confirmed the formation of cross-linked structures via an exchange reaction between the enol isomeric group and the methoxy group.

The weight average molecular weight of the compound was 8,211.

The organopolysiloxane compound of the present invention is useful as a component within metal ion scavengers, surface treatment agents for inorganic materials, interfacial binding agents for composite materials composed of an inorganic material and an organic material, dispersants for inorganic materials, adhesion improvers for improving the bonding of organic-based adhesives to inorganic substrates, and primer compositions.

What is claimed is:

1. An organopolysiloxane compound having both a β-ketoester group-containing organic group and a hydrocarbyloxy group within a single molecule, said compound having an average compositional formula (1) as follows:

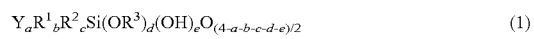

wherein

Y represents an organic group containing a β-ketoester group that may be at least partially enolized, $R^1$ represents a monovalent hydrocarbon group of 1 to 18 carbon atoms that may optionally contain at least one functional group selected from the group consisting of a mercapto group, epoxy group, acryloyloxy group, methacryloyloxy group, alkenyl groups, amino group, halogen atoms, and groups generated when an enolized β-ketoester group undergoes an intramolecular or intermolecular reaction with a hydrocarbyloxy group represented by a formula: $OR^3$, $R^2$ represents a monovalent hydrocarbon group of 1 to 18 carbon atoms that contains no functional groups and is different from $R^1$, $R^3$ represents a monovalent hydrocarbon group of 1 to 4 carbon atoms, and a, b, c, d and e are numbers that satisfy $0.01 \leq a \leq 1$, $0 \leq b < 1$, $0 \leq c \leq 2$, $0 \leq d \leq 2$, and $0 \leq e \leq 1$ respectively, provided that $2 \leq a+b+c+d+e \leq 3$.

2. The organopolysiloxane compound according to claim 1, wherein Y in the average composition formula (1) represents a β-ketoester group-containing organic group, which is represented by a formula: -Q-Z and may be at least partially enolized, wherein Q represents a divalent hydrocarbon group, and Z represents a β-ketoester group represented by a formula shown below:

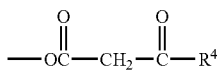

wherein, $R^4$ represents an alkyl group of 1 to 10 carbon atoms, or a phenyl group.

3. The organopolysiloxane compound according to claim 1, wherein in the average composition formula (1), $R^1$ is a monovalent hydrocarbon group of 1 to 18 carbon atoms that contains a mercapto group, an epoxy group, or both a mercapto group and an epoxy group.

4. The organopolysiloxane compound according to claim 1, having an average polymerization degree within a range from 3 to 100.

5. A method of producing the organopolysiloxane compound represented by the average composition formula (1) defined in claim 1, the method comprising:

subjecting (a) at least one β-ketoester group-containing hydrocarbyloxysilane represented by a general formula (2) shown below, or a partial hydrolysis product thereof, or a combination thereof, to a partial homo-hydrolysis and polycondensation:

$$YR^2_m Si(OR^3)_{3-m} \qquad (2)$$

wherein Y, $R^2$ and $R^3$ are as defined in claim 1, and m represents an integer of 0 to 2.

6. A method of producing the organopolysiloxane compound represented by the average composition formula (1) defined in claim 1, the method comprising subjecting:

(a) at least one β-ketoester group-containing hydrocarbyloxysilane represented by a general formula (2) shown below, or a partial hydrolysis product thereof, or a combination thereof, and (b) at least one compound selected from the group consisting of hydrocarbyloxysilanes represented by a general formula (3) shown below, partial hydrolysis products thereof, hydrocarbyloxysilanes represented by a general formula (4) shown below, partial hydrolysis products thereof, and condensation products of at least one of these compounds, to a partial co-hydrolysis and polycondensation $$YR^2_m Si(OR^3)_{3-m} \qquad (2)$$

$$R^1 R^2_n Si(OR^3)_{3-n} \qquad (3)$$

$$R^2_p Si(OR^3)_{4-p} \qquad (4)$$

wherein Y, $R^1$, $R^2$ and $R^3$ are as defined in claim 1, m represents an integer of 0 to 2, n represents an integer of 0 to 2, and p represents an integer of 0 to 3.

7. The organopolysiloxane compound of claim 1, wherein Y is a group having the formula $-(CH_2)_3 OC(O)CH_2C(O)CH_3$, a and b both are 0 so that $R^1$ and $R^2$ are not present, and $R^3$ is a methyl group.

* * * * *

Disclaimer

8,524,933 B2 — Thomas G. Gant, Carlsbad, CA (US); Manoucherhr M. Shahbaz. BENZOQUINOLINE INHIBITORS OF VESICULAR MONOAMINE TRANSPORTER 2. Patent dated September 3, 2013. Disclaimer filed July 22, 2020, by the assignee, Boehringer Ingelheim Pharma GmbH & Co. KG.

Hereby disclaims the term of this patent which would extend beyond September 18, 2029.

*(Official Gazette, March 30, 2021)*